US009462406B2

(12) United States Patent
Hiipakka et al.

(10) Patent No.: US 9,462,406 B2
(45) Date of Patent: Oct. 4, 2016

(54) METHOD AND APPARATUS FOR FACILITATING SPATIAL AUDIO CAPTURE WITH MULTIPLE DEVICES (71) Applicant: Nokia Technologies Oy, Espoo (FI)

(72) Inventors: Jarmo Antero Hiipakka, Espoo (FI); Mikko Tapio Tammi, Tempere (FI); Sampo Vesa, Helsinki (FI); Jussi Severi Uusitalo, Hämeenlinna (FI); Topi Kaaresoja, Tuusula (FI)

(73) Assignee: Nokia Technologies Oy, Espoo (FI)

( * ) Notice: Subject to any disclaimer, the term of this patent is extended or adjusted under 35 U.S.C. 154(b) by 58 days.

(21) Appl. No.: 14/334,185

(22) Filed: Jul. 17, 2014

(65) Prior Publication Data
US 2016/0021477 A1 Jan. 21, 2016

(51) Int. Cl.
| H04N 5/93 | (2006.01) |
| H04S 5/00 | (2006.01) |
| G11B 27/031 | (2006.01) |
| H04S 7/00 | (2006.01) |
| H04N 9/79 | (2006.01) |
| H04N 5/77 | (2006.01) |
| H04N 5/911 | (2006.01) |
| H04N 9/802 | (2006.01) |
| G10L 21/02 | (2013.01) |

(52) U.S. Cl.
CPC ............ *H04S 5/005* (2013.01); *G10L 21/02* (2013.01); *G11B 27/031* (2013.01); *H04N 5/77* (2013.01); *H04N 5/911* (2013.01); *H04N 9/79* (2013.01); *H04N 9/802* (2013.01); *H04S 7/30* (2013.01)

(58) Field of Classification Search
CPC ............................ H04S 5/005; G11B 27/031
USPC ........ 386/285, 280, 287, 321, 337, 338, 340
See application file for complete search history.

(56) References Cited

U.S. PATENT DOCUMENTS

| 6,430,535 | B1 | 8/2002 | Spille et al. |
| 8,379,868 | B2 | 2/2013 | Goodwin et al. |
| 2008/0205658 | A1 | 8/2008 | Breebaart |
| 2009/0192638 | A1 | 7/2009 | Van Leest et al. |
| 2009/0264114 | A1 | 10/2009 | Virolainen et al. |
| 2010/0005052 | A1 | 1/2010 | Maes |
| 2010/0020951 | A1 | 1/2010 | Basart et al. |
| 2010/0119072 | A1 | 5/2010 | Ojanpera |

(Continued)

FOREIGN PATENT DOCUMENTS

WO    WO 2013/083875 A1    6/2013

OTHER PUBLICATIONS

Duraiswami, et al.; "High Order Spatial Audio Capture and Its Binaural Head-Tracked Playback Over Headphones with HRTF Cues"; AES 119th Convention, New York, NY USA; Oct. 7-10, 2005, pp. 1-16.

(Continued)

*Primary Examiner* — Robert Chevalier
(74) *Attorney, Agent, or Firm* — Alston & Bird LLP (57) ABSTRACT

A method, apparatus and computer program product are provided in order to facilitate spatial audio capture by utilizing multiple audio recording devices. In the context of a method, spatial characteristics of sound recorded by a first device are determined. The method also mapping, with a processor, sound recorded by a second device to a location and orientation of the first device. As such, the spatial characteristics of the sound recorded by the second device are modified to match the spatial characteristics of the sound recorded by the first device.

20 Claims, 7 Drawing Sheets

(56) References Cited

U.S. PATENT DOCUMENTS

| | | |
|---|---|---|
| 2010/0246832 A1 | 9/2010 | Villemoes et al. |
| 2012/0128174 A1 | 5/2012 | Tammi et al. |
| 2012/0294449 A1 | 11/2012 | Beack et al. |
| 2013/0022206 A1 | 1/2013 | Thiergart et al. |
| 2013/0044884 A1 | 2/2013 | Tammi et al. |
| 2013/0094683 A1* | 4/2013 | Hansen .......... G09B 21/04 381/309 |
| 2013/0226593 A1 | 8/2013 | Magnusson et al. |
| 2014/0177882 A1* | 6/2014 | Hiruma .......... H04R 5/04 381/303 |
| 2014/0270187 A1* | 9/2014 | Hall .......... H04S 7/303 381/17 |

OTHER PUBLICATIONS

Goodwin, M.; "Primary-Ambient Signal Decomposition and Vector-Based Localization for Spatial Audio Coding and Enhancement"; IEEE International Conference on Acoustics, Speech and Signal Processing; 2007, pp. I-9-I-12.

Politis, A., et al.; "Parametric Spatial Audio Effects"; Proc. of the 15$^{th}$ Int. Conference on Digital Audio Effects (DAFx-12), York, UK, Sep. 17-21, 2012; pp. DAFX1-DAFX8.

Pulkki, V.; "Spatial Sound Reproduction with Directional Audio Coding"; Journal of the Audio Engineering Society; vol. 55, No. 6; Jun. 2007, pp. 503-516.

* cited by examiner

METHOD AND APPARATUS FOR FACILITATING SPATIAL AUDIO CAPTURE WITH MULTIPLE DEVICES

TECHNOLOGICAL FIELD

An example embodiment of the present invention relates generally to spatial audio capture and, more particularly, to spatial audio capture utilizing multiple audio recording devices.

BACKGROUND

Spatial and surround sound audio recording is becoming a more common feature of video recorders and other audio recording devices. Spatial and surround sound audio recording may be performed in various manners, including with discrete multichannel techniques, such as 5.1 and 7.1 surround sound, soundfield-based Ambisonics, as well as techniques that separate the spatial information at least partially from the audio signals. Among those techniques that separate the spatial information at least partially from the audio signals are spatial audio capture (SPAC) and directional audio coding (DirAC).

Regarding these techniques for spatial and surround recording, discrete multi-channel techniques map the transmitted audio channels to fixed loudspeaker positions. As such, modifications, such as rotations, to the soundfield may be cumbersome. The Ambisonics technique records the spatial derivatives, at least to a given order, of the soundfield at one point and enables decoding to varying transducer layouts at reproduction. The Ambisonics technique allows some spatial modifications, such as rotation utilizing matrix multiplication. SPAC and DirAC techniques are based on transmitting one or more audio channels and an associated stream of spatial parameters for multiple frequency bands. The spatial parameters include at least the direction of arrival of the audio signals, but may also include other parameters, such as diffuseness. Like the Ambisonics technique, SPAC and DirAC techniques require decoding for the reproduction transducer set up and may support an arbitrary loudspeaker set up and reproduction over headphones. The SPAC and DirAC techniques also enable spatial modifications by modification of the stream of spatial information. For example, soundfield rotation may be implemented by changing the angles of arrival and the spatial parameters. Further details regarding SPAC techniques are provided by U.S. Patent Application Publication No. US 2012/0128174 and by U.S. Patent Application Publication No. US 2013/0044884, the contents of both of which are incorporated herein in their entirety.

The audio signals captured by spatial and surround sound recording may suffer from disturbances caused by noise, such as mechanical and electrical noise. In regards to video recorders, for example, noise created by the auto-focus and zoom motor may disturb the audio signals. As another example, handheld audio recording devices may correspondingly suffer from handling noise.

BRIEF SUMMARY

A method, apparatus and computer program product are provided in accordance with an example embodiment in order to facilitate spatial audio capture. In this regard, the method, apparatus and computer program product of an example embodiment may utilize multiple devices in order to reduce disturbances, such as those attributable to mechanical and electrical noise that may otherwise reduce the quality of the audio signals recorded by one of the devices. However, the method, apparatus and computer program produce of an example embodiment may process the spatial characteristics of the audio signals captured by multiple devices such that the resulting audio signals have spatial characteristics that cause the audio signals to appear to have been captured at a location and orientation consistent with a desired one of the devices, such as at the location and orientation of a video recorder.

In an example embodiment, a method is provided that includes determining spatial characteristics of sound recorded by a first device. Based upon a relative location of a second device to the first device, the method of this example embodiment also includes mapping, with a processor, sound recorded by the second device to a location and orientation of the first device. As such, the spatial characteristics of the sound recorded by the second device are modified to match the spatial characteristics of the sound recorded by the first device.

In an example embodiment in which the first device is also configured to capture video, the method may also include combining the video captured by the first device and the sound recorded by the second device following modification of the spatial characteristics of the sound recorded by the second device to match the spatial characteristics of the sound recorded by the first device. In an embodiment in which the first device is configured to provide one or more audio channels and an auxiliary data stream that includes the spatial characteristics of the sound recorded by the first device, the method may map the sound recorded by the second device to the location and orientation of the first device by replacing the sound recorded by the first device with the sound recorded by the second device in combination with the auxiliary data stream that includes the spatial characteristics of the sound recorded by the first device.

In an example embodiment, the method may determine the spatial characteristics of the sound recorded by the first device by determining a relative orientation between the first and second devices. In this example embodiment, the method may map the sound recorded by the second device to the location and orientation of the first device by modifying the spatial characteristics of the sound recorded by the second device based upon the relative orientation between the first and second devices. The method of an example embodiment may map the sound recorded by the second device to the location and orientation of the first device by rotating the spatial characteristics of the sound recorded by the second device to match the spatial characteristics of the sound recorded by the first device.

The method of an example embodiment may also include determining that the sound quality of the sound recorded by the first device fails to satisfy a predefined threshold, such as by determining that the sound recorded by the first device includes noise. The method of this example embodiment may map the sound recorded by the second device to the location and orientation of the first device in response to having determined that the sound quality of the sound recorded by the first device fails to satisfy the predefined threshold, such as in response to determining that the sound recorded by the first device includes noise.

In another example embodiment, an apparatus is provided that includes at least one processor and at least one memory including computer program code with the at least one memory and the computer program code configured to, with the at least one processor, cause the apparatus to at least determine spatial characteristics of sound recorded by a first device. The at least one memory and the computer program code are also configured to, with the processor, cause the apparatus of this example embodiment to map, based upon a relative location of a second device to the first device, sound recorded by the second device to a location and orientation of the first device so that the spatial characteristics of the sound recorded by the second device are modified to match the spatial characteristics of the sound recorded by the first device.

In an embodiment in which the first device is also configured to capture video, the at least one memory and the computer program code may be further configured to, with the processor, cause the apparatus to combine the video captured by the first device and the sound recorded by the second device following modification of the spatial characteristics of the sound recorded by the second device to match the spatial characteristics of the sound recorded by the first device. In an example embodiment, the first device is configured to provide one or more audio channels and an auxiliary data stream that includes the spatial characteristics of the sound recorded by the first device. The at least one memory and the computer program code may be configured to, with the processor, cause the apparatus of this example embodiment to map the sound recorded by the second device to the location and orientation of the first device by replacing the sound recorded by the first device with the sound recorded by the second device in combination with the auxiliary data stream that includes the spatial characteristics of the sound recorded by the first device.

The at least one memory and the computer program code may be configured to, with the processor, cause the apparatus of an example embodiment to determine the spatial characteristics of the sound recorded by the first device by determining a relative orientation between the first and second devices. The at least one memory and the computer program code may be configured to, with the processor, cause the apparatus of this example embodiment to map the sound recorded by the second device to the location and orientation of the first device by modifying the spatial characteristics of the sound recorded by the second device based upon the relative orientation between the first and second devices. The at least one memory and the computer program code may be configured to, with the processor, cause the apparatus of an example embodiment to map the sound recorded by the second device to the location and orientation of the first device by rotating spatial characteristics of the sound recorded by the second device to match the spatial characteristics of the sound recorded by the first device.

The at least one memory and the computer program code may be further configured to, with the processor, cause the apparatus of an example embodiment to determine that the sound quality of the sound recorded by the first device fails to satisfy a predefined threshold, such as by determining that the sound recorded by the first device includes noise. The at least one memory and the computer program code may be configured to, with the processor, cause the apparatus of this example embodiment to map the sound recorded by the second device to the location and orientation of the first device in response to determining that the sound quality of the sound recorded by the first device fails to satisfy the predefined threshold, such as in response to determining that the sound recorded by the first device includes noise.

In a further example embodiment, a computer program product is provided that includes at least non-transitory computer-readable storage medium having computer-executable program code portions stored therein with the computer-executable program code portions including program code instructions configured to determine spatial characteristics of sound recorded by a first device. The computer-executable program code portions of this example embodiment also include program code instructions configured to map, based upon a relative location of a second device to the first device, sound recorded by the second device to a location and orientation of the first device. As such, the spatial characteristics of the sound recorded by the second device are modified to match the spatial characteristics of the sound recorded by the first device.

In an embodiment in which the first device is also configured to capture video, the computer-executable program code portions may further include program code instructions configured to combine the video captured by the first device and the sound recorded by the second device following modification of the spatial characteristics of the sound recorded by the second device to match the spatial characteristics of the sound recorded by the first device. In an example embodiment, the first device is configured to provide one or more audio channels and an auxiliary data stream that includes the spatial characteristics of the sound recorded by the first device. In accordance with this example embodiment, the program code instructions configured to map the sound recorded by the second device to the location and orientation of the first device may include program code instructions configured to replace the sound recorded by the first device with the sound recorded by the second device in combination with the auxiliary data stream that includes the spatial characteristics of the sound recorded by the first device.

The program code instructions configured to determine the spatial characteristics of the sound recorded by the first device may include program code instructions configured to determine a relative orientation between the first and second devices. In this example embodiment, the program code instructions configured to map the sound recorded by the second device to the location and orientation of the first device may include program code instructions configured to modify the spatial characteristics of the sound recorded by the second device based upon the relative orientation between the first and second devices. In another example embodiment, the program code instructions configured to map the sound recorded by the second device to the location and orientation of the first device may include program code instructions configured to rotate the spatial characteristics of the sound recorded by the second device to match the spatial characteristics of the sound recorded by the first device.

The computer-executable program code portion of a further example embodiment may include program code instructions configured to determine that the sound quality of the sound recorded by the first device fails to satisfy a predefined threshold. In this example embodiment, the program code instructions configured the map the sound recorded by the second device to the location and orientation of the first device are performed in response to determining that the sound quality of the sound recorded by the first device fails to satisfy the predefined threshold.

In yet another example embodiment, an apparatus is provided that includes means, such as a processor, processing circuitry or the like, for determining spatial characteristics of the sound recorded by a first device. The apparatus of this example embodiment also includes means, such as a processor, processing circuitry or the like, for mapping, based upon a relative location of a second device to the first device, sound recorded by the second device to a location and orientation of the first device. As such, the spatial characteristics of the sound recorded by the second device are modified to match the spatial characteristics of the sound recorded by the first device.

In an example embodiment in which the first device is also configured to capture video, the apparatus may also include means, such as a processor, processing circuitry or the like, for combining the video captured by the first device and the sound recorded by the second device following modification of the spatial characteristics of the sound recorded by the second device to match the spatial characteristics of the sound recorded by the first device. In an embodiment in which the first device is configured to provide one or more audio channels and an auxiliary data stream that includes the spatial characteristics of the sound recorded by the first device, the means for mapping the sound recorded by the second device to the location and orientation of the first device may include means, such as a processor, processing circuitry or the like, for replacing the sound recorded by the first device with the sound recorded by the second device in combination with the auxiliary data stream that includes the spatial characteristics of the sound recorded by the first device.

In an example embodiment, the means for determining the spatial characteristics of the sound recorded by the first device may include means, such as a processor, processing circuitry or the like, for determining a relative orientation between the first and second devices. In this example embodiment, the means for mapping the sound recorded by the second device to the location and orientation of the first device may include means, such as a processor, processing circuitry or the like, for modifying the spatial characteristics of the sound recorded by the second device based upon the relative orientation between the first and second devices. The means of an example embodiment for mapping the sound recorded by the second device to the location and orientation of the first device may include means, such as a processor, processing circuitry or the like, for rotating the spatial characteristics of the sound recorded by the second device to match the spatial characteristics of the sound recorded by the first device.

The apparatus of an example embodiment may also include means, such as a processor, processing circuitry or the like, for determining that the sound quality of the sound recorded by the first device fails to satisfy a predefined threshold, such as by determining that the sound recorded by the first device includes noise. In this example embodiment, the sound recorded by the second device may be mapped to the location and orientation of the first device in response to having determined that the sound quality of the sound recorded by the first device fails to satisfy the predefined threshold, such as in response to determining that the sound recorded by the first device includes noise.

BRIEF DESCRIPTION OF THE DRAWINGS

Having thus described certain embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, an apparatus and a computer program product are provided in accordance with an example embodiment in order to facilitate spatial audio capture utilizing multiple devices. By utilizing multiple devices, the method, apparatus and computer program product of an example embodiment may utilize the sound having the highest quality, such as in combination with video captured by another device, but may process the spatial characteristics in such a manner that the sound appears to have been captured at a desired location and orientation, such as the location and orientation at which the video was captured.

Figure 1:
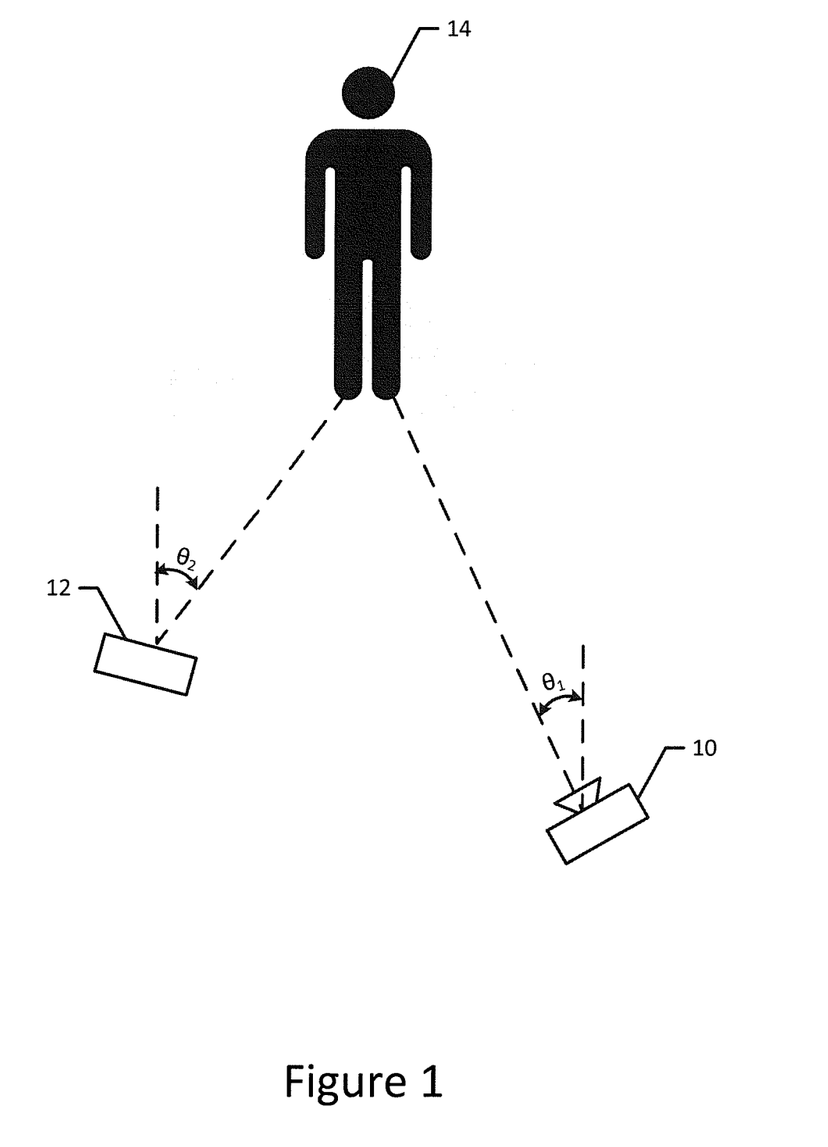
FIG. 1 is a schematic representation of first and second devices configured to capture sound and to thereafter process the spatial characteristics of the sound in accordance with an example embodiment of the present invention.

By way of example, FIG. 1 depicts first and second audio recording devices 10, 12 configured to capture sound generated by a source, such as the spoken word or a song sung by a person 14. The sound recorded by the first and second audio recording devices may be recorded in any of wide variety of formats. The sound that is recorded by one or both of the audio recording devices may be recorded in accordance with a format that is capable of recording at least partial spatial information. For example, the sound may be recorded in formats that include regular stereo, discrete multichannel, Ambisonics, DirAC or SPAC formats. Alternatively, one of the audio recording devices may provide for monaural recording with the spatial information, e.g., spatial parameters, being estimated based upon information provided by another audio recording device that includes additional microphones. Additionally, the sound may be converted from one of the formats to another format in an example embodiment.

The first and second audio recording devices 10, 12 may be any of a wide variety of devices that are configured to capture sound with at least one and, in some embodiments, each of the devices configured for spatial audio capture. In an example embodiment, at least one of the audio recording devices, such as the first device, may be configured not only to capture sound, but also to capture images, such as video. As such, the first device may be embodied by a video recorder, while the second device is embodied by any type of audio recording device, such as a microphone, a headset including one or more microphones, such as binaural microphones, or a device that embodies a microphone.

The audio recording devices, such as the first device 10 and the second device 12, that are configured to capture sound are positioned at different locations and may have different orientations, such as shown in FIG. 1. In this regard, the first device is shown to be disposed at an angle of $\theta_1$ relative to a vertical line and the second device is shown to be disposed at an angle $\theta_2$ relative to a vertical line. Although the audio recording devices are positioned at different locations and, in some embodiments, at different orientations, the audio recording devices are each disposed within the same acoustic space during the recording of the sound.

The audio recording devices 10, 12 may be configured to communicate with each other or with a third device configured for signal processing in accordance with an example embodiment. As shown in FIG. 1, the audio recording devices may be configured to directly communicate with one other, such as via a wireless connection, e.g., a Bluetooth connection, a near field communication (NFC) connection, a WiFi connection, a wireless local area network (WLAN) or any other proximity-based wireless connection, or a wired connection. Additionally or alternatively, the audio recording devices may be configured to communicate with one another via a network such as a cellular network, a wide area network (WAN), e.g., the internet, or the like. In some example embodiments, the audio recording devices do not communicate directly with one another, but, instead, communicate with an intermediate computing device. In this example embodiment, the computing device may be proximate the audio recording devices such that each audio recording device may communicate directly with the computing device, such that via a Bluetooth, NFC, WiFi or WLAN connection or the like. Alternatively, the computing device may be configured to communicate with the audio recording devices via a network. As such, the computing device of this embodiment may be a network device and, in one example embodiment, may be disposed within a cloud computing network 16, such as a device that services to implement a Vyclone or Director's Cut service. The computing device may be configured in a variety of manners including as a mobile terminal, such as a mobile telephone, a smartphone, a personal digital assistant (PDA), a portable computer, a tablet computer, a laptop computer, a music player, a video player, an electronic book or the like, or a fixed computing device, such as a personal computer, a computer workstation, a server or the like.

Figure 2:
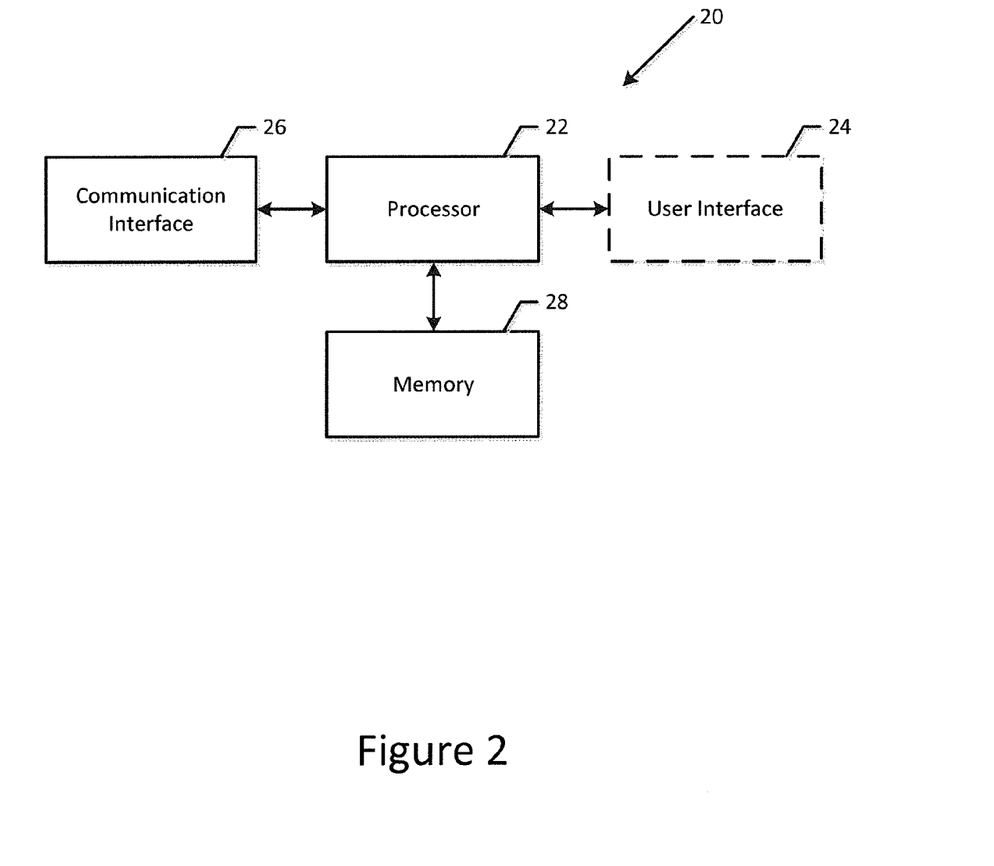
FIG. 2 is a block diagram of an apparatus that may be specifically configured in accordance with an example embodiment of the present invention.

As shown in FIG. 2, an apparatus 20 may be specifically configured in order to perform various operations in accordance with an example embodiment of the present invention as described below. The apparatus may be embodied by any one of the audio recording devices 10, 12 or by a computing device with which the audio recording devices are in communication. While the apparatus may be embodied by any one of the foregoing devices, the apparatus of another example embodiment may be distributed between two or more of the foregoing devices such that two or more of the devices collaborate to perform the various functions in accordance with an example embodiment of the present invention. Regardless of the manner in which the apparatus is embodied, the apparatus may include, be associated with or otherwise be in communication with a processor 22 and a memory device 24, a communication interface 26 and optionally a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by the first or second audio recording device 10, 12 or by a computing device with which the first and second audio recording devices are in communication. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the client device 10 and/or a network entity) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of the illustrated embodiment may also include a communication interface 26 that may be any means such as a device or circuitry embodied in either hardware or a combination of hardware and software that is configured to receive and/or transmit data from/to a communications device in communication with the apparatus. For example, the communication interface may be configured to communicate with one or more audio recording devices and/or a computing device with which the audio recording devices are in communication depending upon the manner in which the apparatus is embodied. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

The apparatus 20 of an example embodiment may optionally also include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In an example embodiment in which the apparatus does include the user interface, the processor 22 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

Figure 3:
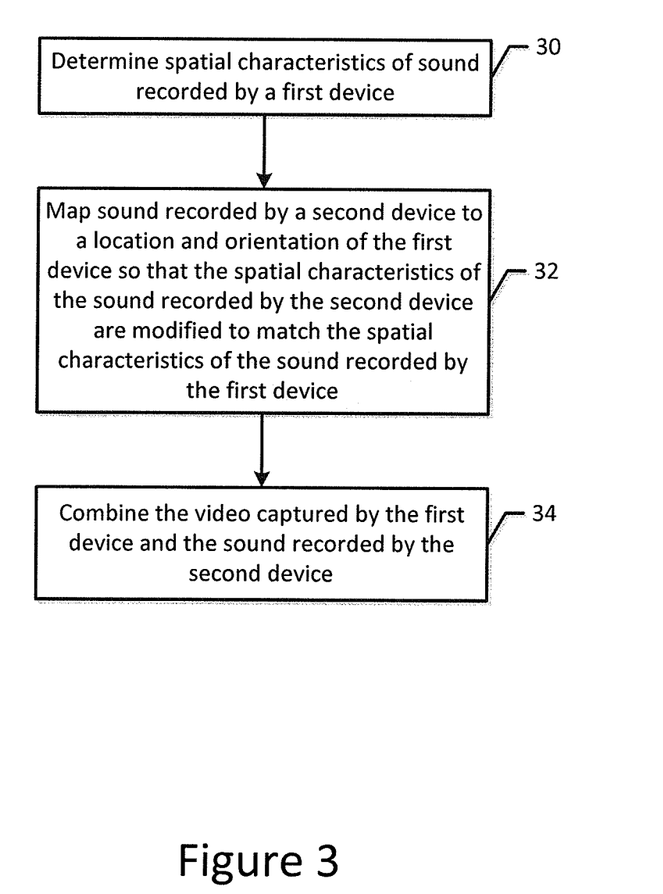
FIG. 3 is a block diagram illustrating operations performed, such as by the apparatus of FIG. 2, in accordance with an example embodiment of the present invention.

Referring now to FIG. 3, the operations performed, such as by the apparatus 20 of FIG. 2, in accordance with an example embodiment in order to facilitate spatial audio capture of sound utilizing multiple audio recording devices are depicted. As shown in block 30 of FIG. 3, the apparatus may include means, such as the processor 22 or the like, for determining spatial characteristics of sound recorded by the first device 10. The sound for which spatial characteristics are determined may be from a variety of sources including directional sources and/or ambience. The spatial characteristics may be defined in various manners including the angle-of-arrival of the sound, the heading of the sound or the like. As described below, the spatial characteristics of the sound recorded by the first device may be provided in various manners. For example, in an instance in which the first device provides for spatial audio capture, the first device may be configured to provide spatial data as an auxiliary data stream, such as in accordance with SPAC or DirAC. Additionally or alternatively, in an instance in which the second device 12 provides for spatial audio capture and the location and orientation of each of the first and second sound recording devices may be determined, the spatial data recorded by the second audio recording device may be transformed to the position and orientation of the first audio recording device so as to represent spatial characteristics of the sound recorded by the first audio recording device. These and other examples will be provided hereinafter.

As shown in block 32 of FIG. 3, the apparatus 20 may also include means, such as the processor 22 or the like, for mapping sound recorded by the second audio recording device 12 to the location and orientation of the first audio recording device 10. As such, the spatial characteristics of the sound recorded by the second audio recording device are modified to match the spatial characteristics of the sound recorded by the first audio recording device. In this regard, the second audio recording device may capture sound with corresponding spatial characteristics that correspond to the location and orientation of the second audio recording device. Since the spatial characteristics of sound recorded by the first audio recording device have previously been determined as described above in conjunction with block 30, the sound recorded by the second audio capturing device may be mapped to the location and orientation of the first audio recording device by modifying the spatial characteristics of the sound recorded by the second audio recording device to match the spatial characteristics of the sound recorded by the first audio recording device. Thus, the sound may be recorded by the second audio recording device but appear to have been captured at a location and orientation that corresponds to the position of the first audio recording device.

In order to map the sound recorded by the second audio recording device 12 to the location and orientation of the first audio recording device 10, the relative location of the second audio recording device to the first audio recording device, such as the distance between the first and second audio recording devices and the orientation of the second audio recording device to the first audio recording device, is determined with the mapping thereafter being based upon the relative location. The relative location of the second audio recording device may be determined in various manners. For example, SPAC techniques may analyze the direction of sound sources captured by two or more microphones at both the first and second audio recording devices and then determine the orientation of the second audio recording device to the first audio recording device based upon a comparison of the sound source directions. Alternatively, each audio recording device may include or otherwise be associated with one or more sensors, such as an accelerometer, gyroscope, magnetometer and/or compass, that may provide orientation information, e.g., heading with respect to magnetic north, pitch and roll, from which the orientation of the second audio recording device to the first audio recording device may be determined. In this example embodiment, the estimates of the sound direction relative to the first audio recording device may be rotated to match the orientation of the second audio recording device so that the spatial impression would be as though the sound were recorded by the second audio recording device.

As noted above, the relative location of the second audio recording device 12 to the first audio recording device 10 is determined with the mapping thereafter being based upon the relative location. In this regard, the location of the second audio recording device may be known such that the relative location, namely, distance and orientation, of the first audio recording device to the known location of the second audio recording device may be determined. Alternatively, the relative location may be determined between the first and second audio recording devices without the location of the second audio recording device being known.

In an example embodiment, the first audio recording device 10 is configured not only to record sound, but also to capture video. For example, the first audio recording device may be a video recorder. As such, the apparatus 20 of this example embodiment may also include means, such as the processor 22 or the like, for combining the video captured by the first audio recording device and the sound recorded by the second audio recording device, such as to form a multimedia file. See block 34 of FIG. 3. Thus, even though the sound that is combined with the video is captured by a different device, that is, the second audio recording device, than the first audio recording device that also captures the video, the sound captured by the second audio recording device appears to have been captured at a location and orientation that corresponds to the first audio recording device as result of the modification of the spatial characteristics of the sound. By capturing the sound with a different audio recording device then the device that also captures the video, the sound that is captured may be free of at least certain types of noise, such as noise attributable to the auto-focus and zoom motor in regards to a video camera or handling noise in regards to a hand held video recorder. As such, the sound captured by the second audio recording device may be of higher quality than that otherwise captured by the first audio recording device.

Additionally, the second audio recording device 12 may be positioned relative to the source 14 of the sound so as to receive a higher quality sound signal. For example, the second audio recording device may be positioned closer to the source of the sound than the first audio recording device 10 is capable of being positioned as shown in FIG. 1. By positioning the second audio recording device closer to the source, the sound-to-noise ratio and/or the direct-to-reverberant ratio of the sound may be better than the sound-to-noise ratio and the direct-to-reverberant ratio of the sound captured by the first audio recording device. The placement of the second audio recording device in close proximity to the source may also be desirable for a variety of other reasons including speaker diarization, speech recognition and/or an analysis of the emotional states of the speakers. By way of example, the second audio recording device may be embodied by a microphone that may be positioned immediately adjacent as speaker, while a video camera that captures a video of the speaker may be positioned in the rear of the room so as to be substantially further from the speaker than the microphone. Thus, the resulting sound captured by the first audio recording device that is combined with the video recorded by the first audio recording device may be of higher quality so as to provide for an improved user experience while still sounding to a listener to have been captured at a location and in an orientation corresponding to the first audio recording device.

Figure 4:
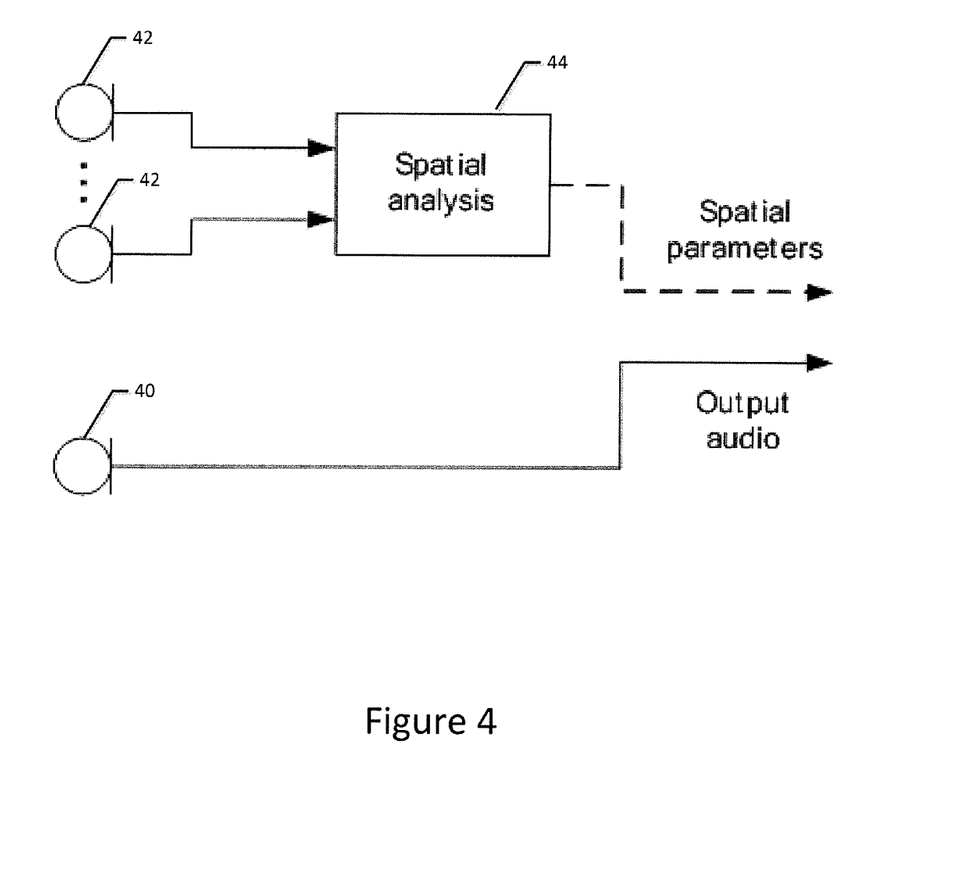
FIG. 4 is a schematic representation of operations performed in accordance with an example embodiment of the present invention.

Referring now to FIG. 4, an example embodiment that includes first and second audio recording devices 10, 12 is depicted. As shown, the second audio recording device may include a microphone 40 and the first audio recording device may include a plurality of microphones 42. In this example embodiment, the first audio recording device, as a result of its multiple microphones, is configured for spatial audio capture such that the first audio recording device is configured to provide one or more audio channels and an auxiliary data steam that includes the spatial characteristics of the sound recorded by the first audio recording device, such as in accordance with SPAC or DirAC. In this example embodiment, the apparatus 20, such as the processor 22, may be configured to perform spatial analysis as shown in block 44 in order to separate the auxiliary data stream that includes the spatial characteristics of the sound recorded by the first audio recording device from the audio channel(s). The second audio recording device may provide for mono or stereo audio capture, but need not provide spatial audio capture.

In order to map the sound recorded by the second audio recording device 12 to the location and orientation of the first audio recording device 10 in accordance with this example embodiment, the apparatus 20, such as the processor 22, may replace the sound recorded by the first audio recording device, with the sound recorded by the second audio recording device in combination with the auxiliary data stream that includes the spatial characteristics of the sound recorded by the first audio recording device. Thus, the sound recorded by the second audio recording device will appear to have been captured at a position that corresponds to the location and orientation of the first audio recording device as a result of its association with the spatial characteristics that have been captured by the first sound recording device.

Figure 5:
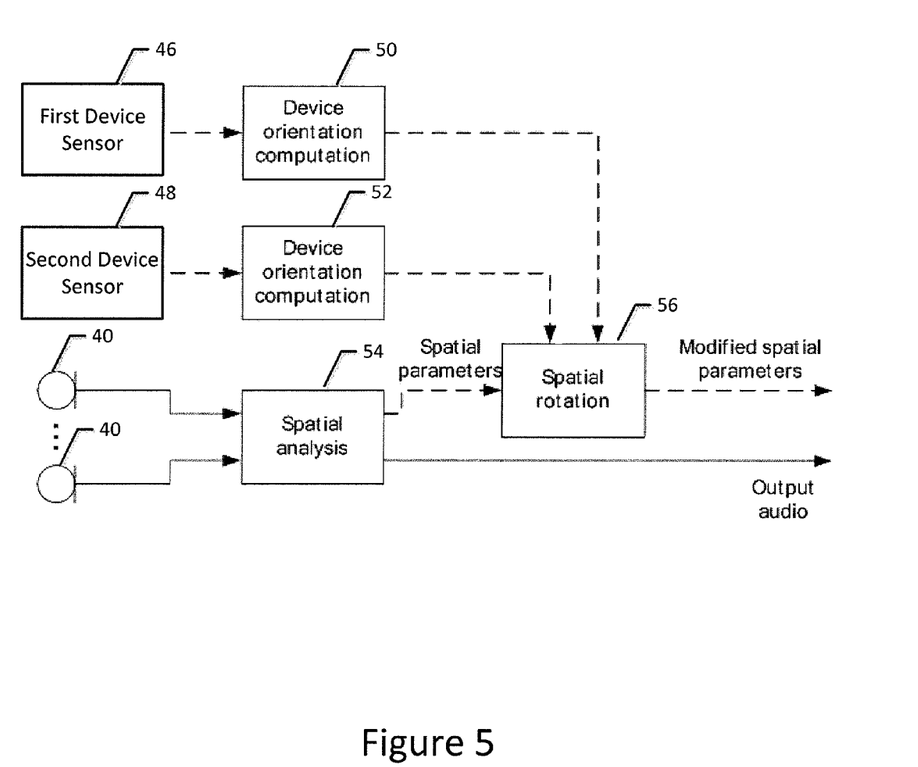
FIG. 5 is a schematic representation of the operations performed in accordance with another example embodiment of the present invention.

In another example embodiment depicted in FIG. 5, the second audio recording device 12 may include a plurality of microphones 40 and, as such, may be configured for spatial audio capture. Although the first audio recording device 10 of this example embodiment need not be configured for spatial audio capture, both the first and the second audio recording devices may include one or more sensors 46, 48 for determining the location and/or orientation of the first and second audio recording devices, respectively. The first and second audio recording devices may include various types of sensors including a global positioning system (GPS) device, accelerometers, gyroscopes, magnetometers and the like.

In this example embodiment, the apparatus 20, such as the processor 22, is configured to determine the relative orientation between the first and second audio recording devices 10, 12. In the illustrated embodiment, the apparatus, such as the processor, may be configured to separately determine the orientation of the first audio recording device and the second audio recording device as shown by blocks 50 and 52, respectively. Since the second audio recording device of this example embodiment is configured for spatial audio capture, the second audio recording device may provide one or more audio channels and an auxiliary data stream that includes the spatial characteristics of the sound recorded by the second audio recording device. As such, the apparatus, such as the processor, may be configured as shown in block 54 to perform spatial analysis so as to separate the spatial characteristics of the sound recorded by the second audio recording device from the sound itself, that is, from the one or more audio channels designated audio output in FIG. 5. Based upon the spatial characteristics of the sound recorded by the second audio recording device and the relative orientation between the first and second audio recording devices, such as may be determined by comparison of the respective orientations of the first and second sound recording devices, the apparatus, such as the processor, may be configured to modify the spatial characteristics of the sound recorded by the second audio recording device based upon the relative orientation between the first and second audio recording devices such that the resulting spatial characteristics correspond to sound captured at the location and orientation of the first sound recording device.

Although the spatial characteristics of the sound recorded by the second audio recording device 12 may be modified in various manners, the spatial characteristics of the sound recorded by the second audio recording device may be spatially rotated according to the relative orientation angles of the first and second audio recording devices. For example, the apparatus 20, such as the processor 22, may be configured to rotate the spatial representation of the sound recorded by the second audio recording device to minimize directional errors between the sound recorded by the first and second sound recording devices. For example, sound represented by a first-order Ambisonics signal may be rotated by performing a matrix multiplication on the signal.

Figure 6:
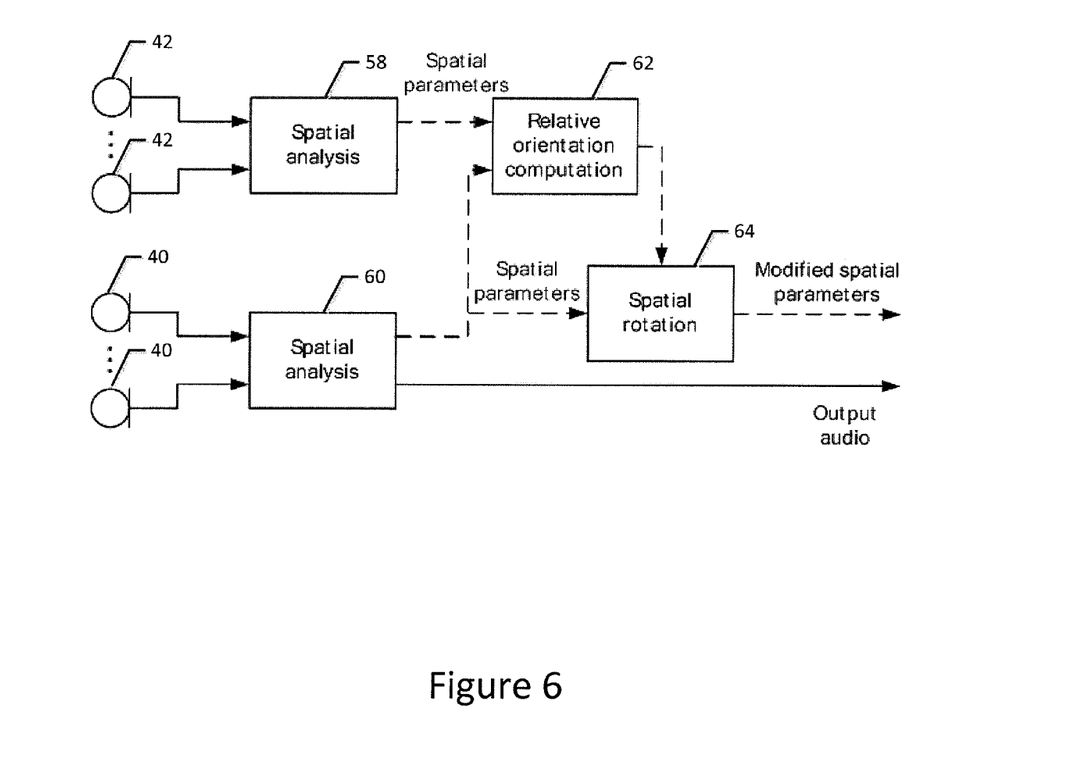
FIG. 6 is a schematic representation of the operations performed in accordance with a further example embodiment of the present invention.

As shown in FIG. 6, the first and second audio recording devices 10, 12 of another example embodiment may both provide for spatial audio capture. In this example embodiment, the apparatus 20, such as the processor 22, may be configured to perform spatial analysis as shown in blocks 58 and 60 on the sound recorded by the first and second audio capturing devices, respectively, in order to separate the spatial characteristics of the sound recorded by the first and second audio recording devices from the sound itself, such as by separating an auxiliary data stream containing the spatial characteristics from via one or more audio channels. Based upon the spatial characteristics of the sound recorded by the first and second audio recording devices, the apparatus, such as the processor, may be configured to determine the relative orientation between the first and second audio recording devices as shown at block 62. Based upon the relative orientation between the first and second audio recording devices and the spatial characteristics of the sound recorded by the second audio recording device, the apparatus, such as the processor, may be configured to modify the spatial characteristics of the sound recorded by the second audio recording device based upon the relative orientation between the first and second audio recording devices such that the resulting spatial characteristics correspond to sound captured at the location and orientation of the first sound recording device. As described above, the spatial characteristics of the sound recorded by the second audio recording device may be modified by rotating the spatial representation of the sound recorded by the second audio recording device, such as to minimize directional errors between the sound recorded by the first and second audio recording devices.

In addition to the orientation of the first audio recording device 10, the apparatus 20, such as the processor 22, of an example embodiment may be configured to map the sound recorded by the second audio recording device 12 to the location of the first audio recording device. In accordance with the example embodiments of the present invention, the location of the first audio recording device may be represented not only by the precise or relative location of the first audio recording device, but, instead, by a distance between the first and second audio recording devices which defines a set of potential locations of the first audio recording device. In this regard, the apparatus 20, such as the processor 22, may be configured determine the location of the first audio recording device by determining the distance between the first and second audio recording devices in various manners including with a cross-correlation analysis.

Figure 7:
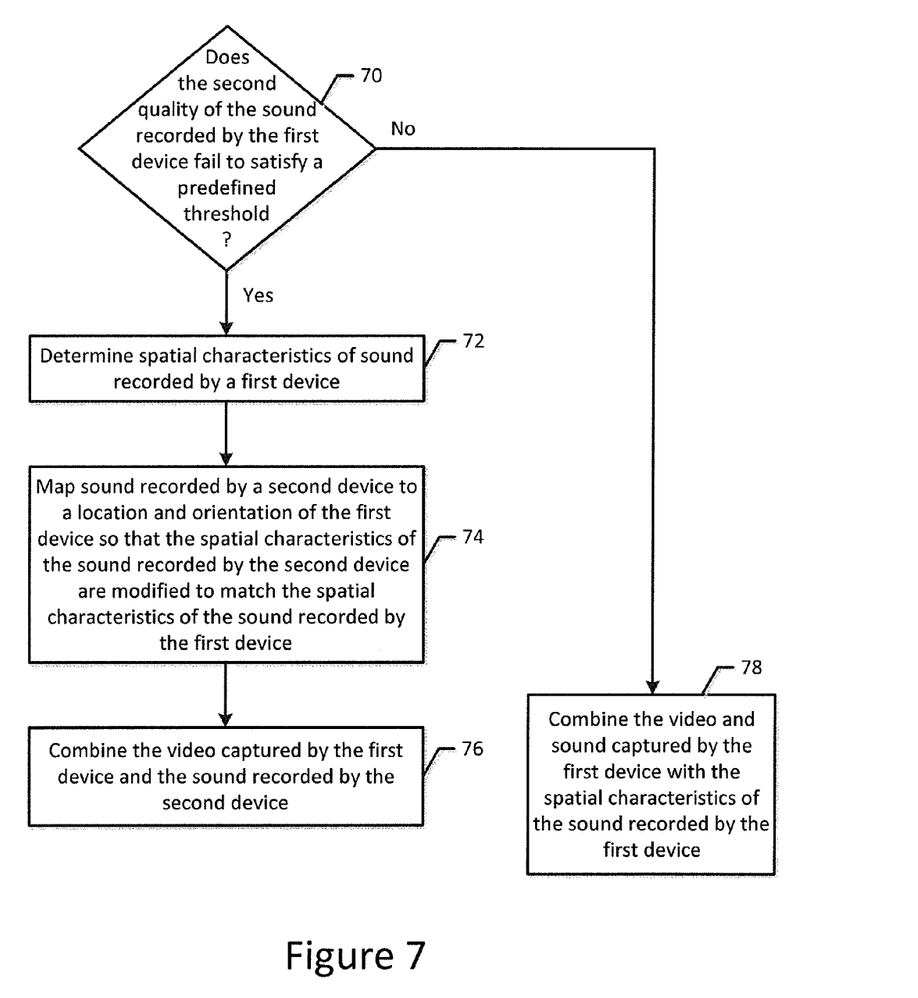
FIG. 7 is a flowchart illustrating operations performed, such as by the apparatus of FIG. 2, in accordance with another example embodiment of the present invention.

Referring now to FIG. 7, the operations performed, such as by the apparatus 20, in accordance with another example embodiment of the present invention are depicted. In this embodiment, the apparatus may be configured to utilize the sound recorded by the first audio recording device 10, such as the same audio recording device that also captures video, unless and until the sound quality of the sound recorded by the first audio recording device falls below a predefined threshold. In an instance in which the sound recorded by the first audio recording device falls below the predefined threshold, the apparatus may be configured to then utilize the sound recorded by the second audio recording device 12, albeit with the spatial characteristics of the sound recorded by the second audio recording device being modified to match the spatial characteristics of the sound recorded by the first audio recording device.

In this regard and as shown by block 70, the apparatus 20 may include means, such as the processor 22 or the like, for determining whether the sound quality of the sound recorded by the first audio recording device 10 fails to satisfy the predefined threshold, such as by determining that the sound recorded by the first audio recording device includes noise. Although the determination as to whether the sound quality satisfies the predefined threshold may be performed automatically, such as by the apparatus, the determination may alternatively be made manually in other embodiments. In an instance in which the sound quality of the sound recorded by the first audio recording device does not fail to satisfy the predefined threshold, that is, in an instance in which the sound quality of the sound recorded by the first audio recording device does satisfy the predefined threshold, the apparatus may include means, such as the processor or the like, for combining the video and sound captured by the first audio recording device with the spatial characteristics of the sound recorded by the first audio recording device as shown in block 78. Thus, in this instance, the apparatus, such as the processor, does not necessarily make use of the sound recorded by the second audio recording device 12.

However, in an instance in which the sound quality of the sound recorded by the first audio recording device 10 does fail to satisfy the predefined threshold, the apparatus 20 may include means, such as the processor 22 or the like, for determining the spatial characteristics of the sound recorded by the first audio recording device as shown at block 72. As depicted in block 74 of FIG. 7, the apparatus may also include means, such as the processor or the like, for mapping the sound recorded by the second audio recording device 12 in this instance to a location and orientation of the first audio recording device so that the spatial characteristics of the sound recorded by the second audio recording device are modified to match the spatial characteristics of the sound recorded by the first audio recording device. For example, the second audio recording device may be configured for monaural recording with the spatial characteristics being provided by the first audio recording device, such as by the location and orientation of the first audio recording device. In this example embodiment, the spatial characteristics of the sound recorded by the second audio recording device may be modified by utilizing the spatial characteristics provided by the first audio recording device as the spatial characteristics of the sound recorded by the second audio recording device even though the second audio recording device did not otherwise capture any spatial characteristics. Thereafter, the apparatus may include means, such as the processor or the like, for combining the video captured by the first audio recording device and the sound recorded by the second audio recording device as shown in block 76 of FIG. 7. Thus, the sound that is combined with the video may continue to be of a relatively high quality even in an instance in which the sound captured by the first audio recording device is degraded, such as by noise, and has a quality that falls below the predefined threshold.

In some example embodiments, the apparatus 20, such as the processor 22, may be configured to automatically utilize the sound recorded by the second audio recording device 12 in an instance in which the sound quality of the sound recorded by the first audio recording device 10 fails to satisfy the predefined threshold. However, in other example embodiments, the apparatus, such as the processor, may only utilize the sound recorded by the second audio recording device in an instance in which the sound quality of the sound recorded by the second audio recording device does satisfy the predefined threshold and/or only in an instance in which the sound recorded by the second audio recording device has a greater sound quality than the sound recorded by the first audio recording device. In yet another example embodiment, the apparatus, such as the processor, does not necessarily utilize the sound recorded by the first audio recording device up until the point in time at which the sound quality of the sound recorded by the first audio recording device falls below the predefined threshold. Instead, the apparatus, such as the processor, of this other example embodiment may determine the sound quality of the sound recorded by each of the audio recording devices and may utilize the sound recorded by the audio recording device that has the greatest sound quality. In an instance in which the sound having the greatest sound quality is captured by an audio recording device other than the first audio recording device that may also optionally capture a video, the apparatus, such as the processor, may be configured to map the sound recorded by the audio recording device that is of the highest sound quality to a location and orientation of the first audio recording device so that the spatial characteristics of the sound recorded by the audio recording device that has the greatest sound quality are modified to match the spatial characteristics of the sound recorded by the first audio recording device. Thus, the resulting multimedia file, including the video and the corresponding sound, may be of improved quality as a result of the utilization of the sound having the greatest sound quality.

The mapping of the sound recorded by the second audio recording device 12 to the location and orientation of the first audio recording device 10 by modifying the spatial characteristics of the sound recorded by the second audio recording device to match the spatial characteristics of the sound recorded by the first audio recording device may be performed repeatedly. In this regard, the spatial characteristics of the first and second audio recording devices may be repeatedly determined at each of a plurality of different times over the time period during which the sound was captured. As such, the apparatus 20, such as the processor 22, may be configured to separately map the sound recorded by the second audio recording device to the location and orientation of the first audio recording device at each of the instances in time based upon the spatial characteristics of the sound captured by the first and second audio recording devices at the respective instance in time. As such, the mapping determined by the apparatus, such as the processor, may vary over the course of time if the spatial characteristics of the sound recorded by the first and second audio recording device correspondingly change over time.

Additionally or alternatively, the spatial characteristics recorded by the first and second audio recording devices 10, 12 may be recorded at each of a plurality of different frequencies at a respective instance in time. Thus, the apparatus 20, such as the processor 22, may be configured to map the sound recorded by the second audio recording device to the location and orientation the first audio recording device based upon the spatial characteristics of the sound recorded by the first and second audio recording devices at each of the plurality of frequencies, such as at each of the frequencies within the range of frequencies that are audible for humans.

The method, apparatus 20 and computer program product of an example embodiment may be initiated or otherwise activated in various manners. For example, the method, apparatus and computer program may be initiated automatically in response to two or more audio recording devices being disposed in the same acoustic space with at least one of the audio recording devices being configured for spatial audio capture and the audio recording devices being configured to communicate with one and other, either directly or indirectly. In an example embodiment, the audio recording devices may initially be paired, such as either directly with one another or through a network such as a cloud computing network 16.

In another example embodiment, initiation of the method, apparatus 20 and computer program product may require manual confirmation prior to initiation. In this regard, the first audio recording device 10 may be configured to provide notification, such as an icon presented by the user interface 28, e.g., a touch screen, of the first audio recording device, that indicates that a second audio recording device 12 is available in the same acoustic space for recording the sound. In an instance in which the user of the first audio recording device desires to activate the method, apparatus and computer program product of an example embodiment, the user may provide input indicative of the desire to utilize the second audio recording device, such as by tapping or otherwise actuating the icon that is presented on the touch screen of the first audio recording device. Thereafter, the first audio recording device may commence recording sound and, in some embodiments, video. Additionally, the first audio recording device of this example embodiment may also cause an instruction to be provided to the second audio recording device to initiate its recordation of sound from the same source.

Although a system employing first and second audio recording devices 10, 12 has been described herein above, the system may include additional audio recording devices, such as three or more audio recording devices. In this example embodiment, this system may include a first audio recording device (that may also optionally be configured to record video) and a plurality of second audio recording devices. As such, the apparatus 20, such as the processor 22, may be configured to determine which of the second audio recording devices has captured sound of the highest quality. The apparatus, such as the processor, may be configured to determine the quality of the recorded sound in various, manners, such as by analyzing various parameters associated with the sound, e.g., the signal-to-noise ratio, the direct-to-reverberant ratio or the like. Alternatively, the apparatus, such as the processor, may be configured to determine the quality of the sound by identifying the second audio recording device that has remained most stationary over the duration of the audio recording and/or the second audio record device closest to the source of the sound as the second audio recording device that is most likely to have captured the highest quality sound.

The apparatus 20, such as the processor 22, of this example embodiment may then combine the sound of the highest quality that is recorded by a second audio recording device 12 with the video captured by the first audio recording device 10. As described above and in accordance with an example embodiment of the present invention, the apparatus, such as the processor, may be configured to map the spatial characteristics of the sound of the highest quality that is captured by a second audio recording device to a location and orientation corresponding to the position of the first audio recording device.

Regardless of the number of second audio recording devices 12, the method, apparatus 20 and computer program product may be configured to map the spatial characteristics of the sound recorded by a second audio recording device to a location and orientation corresponding to the position of the first audio recording device 10 in real time as the sound is recorded by the first and second audio recording devices. Alternatively, the method, apparatus and computer program product may be performed off-line with the apparatus, such as the processor, configured to map the spatial characteristics of the sound recorded by a second audio recording device to a location and orientation corresponding to the position of the first audio recording device following the recordation of the sound and the storage of the sound and the corresponding spatial characteristics, such as by memory 24, as well as time information to permit time synchronization.

As described above, FIGS. 3 and 7 illustrate flowcharts of an apparatus 20, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining spatial characteristics of sound recorded by a first device; and
   based upon at least one of a relative location and orientation of a second device to the first device, mapping, with a processor, sound recorded by the second device to at least one of a location and orientation of the first device so that the spatial characteristics of the sound recorded by the second device are modified based upon the spatial characteristics of the sound recorded by the first device.

2. A method according to claim 1 wherein the first device is also configured to capture video, and wherein the method further comprises combining the video captured by the first device and the sound recorded by the second device following modification of the spatial characteristics of the sound recorded by the second device based upon the spatial characteristics of the sound recorded by the first device.

3. A method according to claim 1 wherein the first device is configured to provide one or more audio channels and an auxiliary data stream that includes the spatial characteristics of the sound recorded by the first device, and wherein mapping the sound recorded by the second device to at least one of the location and orientation of the first device comprises replacing the sound recorded by the first device with the sound recorded by the second device in combination with the auxiliary data stream that includes the spatial characteristics of the sound recorded by the first device.

4. A method according to claim 1 wherein determining the spatial characteristics of the sound recorded by the first device comprises determining the relative location and the relative orientation between the first and second devices, and wherein mapping the sound recorded by the second device to the location and orientation of the first device comprises modifying the spatial characteristics of the sound recorded by the second device based upon the relative location and the relative orientation between the first and second devices.

5. A method according to claim 1 wherein mapping the sound recorded by the second device to at least one of the location and orientation of the first device comprises rotating the spatial characteristics of the sound recorded by the second device based upon the spatial characteristics of the sound recorded by the first device.

6. A method according to claim 1 further comprising determining that a sound quality of the sound recorded by the first device fails to satisfy a predefined threshold, wherein mapping the sound recorded by the second device to at least one of the location and orientation of the first device is performed in response to determining that the sound quality of the sound recorded by the first device fails to satisfy the predefined threshold.

7. A method according to claim 6 wherein determining that the sound quality of the sound recorded by the first device fails to satisfy the predefined threshold comprises determining that the sound recorded by the first device includes noise, and wherein mapping the sound recorded by the second device to at least one of the location and orientation of the first device is performed in response to determining that the sound recorded by the first device includes noise.

8. An apparatus comprising at least one processor and at least one memory including computer program code, the at least one memory and the computer program code configured to, with the processor, cause the apparatus to at least:
   determine spatial characteristics of sound recorded by a first device; and
   based upon at least one of a relative location and orientation of a second device to the first device, map sound recorded by the second device to at least one of a location and orientation of the first device so that the spatial characteristics of the sound recorded by the second device are modified based upon the spatial characteristics of the sound recorded by the first device.

9. An apparatus according to claim 8 wherein the first device is also configured to capture video, and wherein the at least one memory and the computer program code are further configured to, with the processor, cause the apparatus to combine the video captured by the first device and the sound recorded by the second device following modification of the spatial characteristics of the sound recorded by the second device based upon the spatial characteristics of the sound recorded by the first device.

10. An apparatus according to claim 8 wherein the first device is configured to provide one or more audio channels and an auxiliary data stream that includes the spatial characteristics of the sound recorded by the first device, and wherein the at least one memory and the computer program code are configured to, with the processor, cause the apparatus to map the sound recorded by the second device to at least one of the location and orientation of the first device by replacing the sound recorded by the first device with the sound recorded by the second device in combination with the auxiliary data stream that includes the spatial characteristics of the sound recorded by the first device.

11. An apparatus according to claim 8 wherein the at least one memory and the computer program code are configured to, with the processor, cause the apparatus to determine the spatial characteristics of the sound recorded by the first device by determining the relative location and the relative orientation between the first and second devices, and wherein the at least one memory and the computer program code are configured to, with the processor, cause the apparatus to map the sound recorded by the second device to the location and orientation of the first device by modifying the spatial characteristics of the sound recorded by the second device based upon the relative location and the relative orientation between the first and second devices.

12. An apparatus according to claim 8 wherein the at least one memory and the computer program code are configured to, with the processor, cause the apparatus to map the sound recorded by the second device to at least one of the location and orientation of the first device by rotating the spatial characteristics of the sound recorded by the second device based upon the spatial characteristics of the sound recorded by the first device.

13. An apparatus according to claim 8 wherein the at least one memory and the computer program code are further configured to, with the processor, cause the apparatus to determine that a sound quality of the sound recorded by the first device fails to satisfy a predefined threshold, wherein the at least one memory and the computer program code are configured to, with the processor, cause the apparatus to map the sound recorded by the second device to the at least one of the location and orientation of the first device in response to determining that the sound quality of the sound recorded by the first device fails to satisfy the predefined threshold.

14. An apparatus according to claim 13 wherein the at least one memory and the computer program code are configured to, with the processor, cause the apparatus to determine that the sound quality of the sound recorded by the first device fails to satisfy the predefined threshold by determining that the sound recorded by the first device includes noise, and wherein the at least one memory and the computer program code are configured to, with the processor, cause the apparatus to map the sound recorded by the second device to at least one of the location and orientation of the first device in response to determining that the sound recorded by the first device includes noise.

15. A computer program product comprising at least one non-transitory computer-readable storage medium having computer-executable program code portions stored therein, the computer-executable program code portions comprising program code instructions configured to:

determine spatial characteristics of sound recorded by a first device; and based upon at least one of a relative location and orientation of a second device to the first device, map sound recorded by the second device to at least one of a location and orientation of the first device so that the spatial characteristics of the sound recorded by the second device are modified based upon the spatial characteristics of the sound recorded by the first device.

16. A computer program product according to claim 15 wherein the first device is also configured to capture video, and wherein the computer-executable program code portions further comprise program code instructions configured to combine the video captured by the first device and the sound recorded by the second device following modification of the spatial characteristics of the sound recorded by the second device based upon the spatial characteristics of the sound recorded by the first device.

17. A computer program product according to claim 15 wherein the first device is configured to provide one or more audio channels and an auxiliary data stream that includes the spatial characteristics of the sound recorded by the first device, and wherein the program code instructions configured to map the sound recorded by the second device to at least one of the location and orientation of the first device comprise program code instructions configured to replace the sound recorded by the first device with the sound recorded by the second device in combination with the auxiliary data stream that includes the spatial characteristics of the sound recorded by the first device.

18. A computer program product according to claim 15 wherein the program code instructions configured to determine the spatial characteristics of the sound recorded by the first device comprise program code instructions configured to determine the relative location and relative orientation between the first and second devices, and wherein the program code instructions configured to map the sound recorded by the second device to the location and orientation of the first device comprise program code instructions configured to modify the spatial characteristics of the sound recorded by the second device based upon the relative location and the relative orientation between the first and second devices.

19. A computer program product according to claim 15 wherein the program code instructions configured to map the sound recorded by the second device to at least one of the location and orientation of the first device comprise program code instructions configured to rotate the spatial characteristics of the sound recorded by the second device based upon the spatial characteristics of the sound recorded by the first device.

20. A computer program product according to claim 15 wherein the computer-executable program code portions further comprise program code instructions configured to determine that a sound quality of the sound recorded by the first device fails to satisfy a predefined threshold, wherein the program code instructions configured to map the sound recorded by the second device to at least one of the location and orientation of the first device is performed in response to determining that the sound quality of the sound recorded by the first device fails to satisfy the predefined threshold.

* * * * *

UNITED STATES PATENT AND TRADEMARK OFFICE
CERTIFICATE OF CORRECTION

PATENT NO. : 9,462,406 B2
APPLICATION NO. : 14/334185
DATED : October 4, 2016
INVENTOR(S) : Hiipakka et al.

It is certified that error appears in the above-identified patent and that said Letters Patent is hereby corrected as shown below:

In the Claims

Column 20,
Lines 49 and 50, "to the at least one of" should read --to at least one of--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*